(12) United States Patent
Flores et al.

(10) Patent No.: US 8,126,135 B2
(45) Date of Patent: Feb. 28, 2012

(54) METHOD FOR MANAGING RESOURCES IN A MULTI-CHANNELED CUSTOMER SERVICE ENVIRONMENT

(75) Inventors: Romelia Flores, Keller, TX (US); Biao Hao, Bedford, TX (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/396,328

(22) Filed: Mar. 2, 2009

(65) Prior Publication Data

US 2009/0225764 A1 Sep. 10, 2009

Related U.S. Application Data

(63) Continuation of application No. 10/602,287, filed on Jun. 24, 2003, now Pat. No. 7,519,173.

(51) Int. Cl.
*H04M 3/00* (2006.01)
*H04M 5/00* (2006.01)

(52) U.S. Cl. .......... 379/265.01; 379/265.06; 379/265.12

(58) Field of Classification Search .............. 379/265.01, 379/265.03, 265.06, 265.12, 265.11, 210.01
See application file for complete search history.

(56) References Cited

U.S. PATENT DOCUMENTS

| | | | |
|---|---|---|---|
| 5,345,380 A | 9/1994 | Babson, III et al. | |
| 5,881,131 A | 3/1999 | Farris et al. | |
| 5,914,951 A | 6/1999 | Bentley et al. | |
| 5,956,024 A | 9/1999 | Strickland et al. | |
| 6,134,530 A | 10/2000 | Bunting et al. | |
| 6,147,975 A | 11/2000 | Bowman-Amuah | |
| 6,170,689 B1 | 1/2001 | Flesher et al. | |
| 6,177,932 B1 | 1/2001 | Galdes et al. | |
| 6,337,904 B1 | 1/2002 | Gisby | |
| 6,351,770 B1 | 2/2002 | Li et al. | |
| 6,404,884 B1 | 6/2002 | Marwell et al. | |
| 6,449,588 B1 | 9/2002 | Bowman-Amuah | |
| 6,510,427 B1 | 1/2003 | Bossemeyer et al. | |
| 6,724,887 B1 | 4/2004 | Eilbacher et al. | |
| 6,798,876 B1 | 9/2004 | Bala | |
| 6,879,685 B1 | 4/2005 | Peterson et al. | |
| 7,023,979 B1 | 4/2006 | Wu et al. | |
| 7,058,625 B2 | 6/2006 | Bossemeyer et al. | |
| 7,062,031 B2 | 6/2006 | Becerra et al. | |
| 7,127,059 B2 * | 10/2006 | Galvin | 379/265.03 |
| 7,133,828 B2 | 11/2006 | Scarano et al. | |
| 2002/0059282 A1 | 5/2002 | Andersson et al. | |
| 2003/0041056 A1 | 2/2003 | Bossemeyer et al. | |
| 2004/0172323 A1 | 9/2004 | Stamm | |
| 2005/0086186 A1 | 4/2005 | Sullivan et al. | |
| 2006/0184526 A1 | 8/2006 | Bossemeyer et al. | |

* cited by examiner

*Primary Examiner* — Thjuan K Addy
(74) *Attorney, Agent, or Firm* — Novak Druce + Quigg LLP

(57) ABSTRACT

A method for managing custom relationship management (CRM) resources including communicatively linking a service router to a plurality of service resources. For each of the service resources, at least one routing criterion can be established. A multitude of service requests can be received by the service router via a multitude of communication channels. Each service request can be analyzed for request characteristics. The request characteristics can then be compared to routing criteria. Each of the service requests can be automatically routed to a selected service resource based at least in part upon the previous comparison. Values for the routing criteria can be dynamically altered based upon feedback.

17 Claims, 5 Drawing Sheets

METHOD FOR MANAGING RESOURCES IN A MULTI-CHANNELED CUSTOMER SERVICE ENVIRONMENT

CROSS-REFERENCE TO RELATED APPLICATION

This application is a continuation of, and accordingly claims the benefit of, U.S. patent application Ser. No. 10/602,287, now issued U.S. Pat. No. 7,519,173, which was filed on Jun. 24, 2003, and which is hereby incorporated by reference in its entirety.

BACKGROUND OF THE INVENTION

1. Technical Field

The present invention relates to the field of customer service and, more particularly, to managing resources in a multi-channeled customer service environment.

2. Description of the Related Art

Customer relationship management (CRM) allows the formation of individualized relationships with customers with the aim of improving customer satisfaction and maximizing profits. A corporation effectively utilizing CRM can identify the most profitable customers and provide them the highest level of service. Further, CRM can help a corporation streamline existing processes, adjust staffing requirements, and focus corporate goals and objectives in a customer-centric manner.

To accomplish these goals, CRM systems require a multitude of service resources that are capable of responding to customer service requests. The customer service requests can be received through a variety of communication channels. Communication channels can include, for example, a telephone channel, an electronic mail (email) channel, an Internet chat channel, a teleconferencing channel, an interactive Web channel, and the like.

CRM systems can utilize a centralized hub, called an intelligent router or service router, to route service requests to available service resources. The service router can automatically direct service requests to preferred service resources based upon predefined parameters and rules. The parameters and rules used by conventional service routers can include customer service representative (CSR) profiles and routing rules. Notably, a CSR is a service resource commonly utilized to respond to CRM service requests.

A CSR profile can be established for each CSR and can be used by the service router to determine the availability of each CSR for request handling purposes. CSR profiles can contain availability times for each CSR. For example, a CSR profile can specify an availability of Monday-Friday, 9 am-5 pm for a telephone channel and an availability of Saturday, 10 am-2 pm for an email channel. The channels each CSR is qualified to handle are generally determined subjectively by management personnel or through a skill test. For example, the skill test for the Internet chat channel can test a CSR's typing skills and familiarity with basic Internet chatting features. Conventional CSR profiles are manually updated on an annual basis to reflect changes in CSR qualifications and availability.

Routing rules can define current system states and provide request routing algorithms and/or heuristics based at least in part upon defined system states. For example, a current system state can indicate whether a CSR is currently signed onto the CRM system. If not, the routing rules can indicate that the CRM is not available for handling service request. The modification of routing rules generally requires an administrator to perform manual alterations. Routing rules are typically maintained within a data space separate from the CRS profile data space.

SUMMARY OF THE INVENTION

The invention disclosed herein provides a method, a system, and an apparatus for managing service resources for purposes of responding to service requests. More specifically, a service router can automatically route service requests to service resources based upon predefined routing criteria. Routing criteria can include such criteria as resource availability, resource skills, resource language, resource location, resource cost, resource service efficiency, resource sales efficiency, resource customer satisfaction, and/or resource management satisfaction. Different values for each routing criteria can be established for each service resource. Further, a resource preference rating can be computed for each available service resource based upon a sum of routing criteria values. The service router can route service requests to the service resource with the most favorable resource preference rating. In one embodiment, routing criteria values can be dynamically altered responsive to feedback.

One aspect of the present invention can include a method for managing custom relationship management (CRM) resources including communicatively linking a service router to a plurality of service resources. For each of the service resources, at least one routing criterion can be established. A multitude of service requests can be received by the service router via a multitude of communication channels. The service requests can be analyzed for request characteristics that can be compared to routing criteria. Each of the service requests can then be automatically routed to a selected service resource based at least in part upon the comparison. The routing criteria can be dynamically altered based upon feedback.

Communication channels can include telephony channels, teleconference channels, co-browsing channels, Internet chat channels, instant messenger channels, email channels, postal mail channels, fax channels, and the like. A co-browsing channel can be a communication channel involving two or more interactively linked Web browsing applications, wherein operations performed on either of the linked browsers affects the other linked browser. Routing criteria can include resource availability, resource skills, resource language, resource location, resource cost, resource service efficiency, resource sales efficiency, resource customer satisfaction, and/or resource management satisfaction.

At least one communication channel can be identified for each of the service resources. Once a service resource has been selected to respond to a service request, a response communication channel can be selected. At least a portion of the predefined routing criteria can have communication channel specific values. In one embodiment, feedback can be received from multiple sources and can reflect past performance in handling past service requests. The feedback can be automatically extracted from a feedback instrumentality. Further, a feedback rating can be assigned to the feedback.

In another embodiment, customer sales information can be data mined to rate the success of a particular service request response. In response to the data mining, values for routing criteria can be altered. In yet another embodiment, service requests can be monitored to obtain performance information called efficiency metrics. Values for routing criteria can be dynamically altered based upon the efficiency metrics. Alternatively or conjunctively, parameters affecting at least a portion or the values for routing criteria can be administratively modified via a routing management interface.

Another aspect of the present invention can include a method for routing customer service requests within a CRM system. The method can include receiving a service request from a customer via a communication channel and searching a routing data store for available service resources, which can include customer service representatives (CSRs). For each available service resource, a resource preference rating can be computed based at least in part upon previous service resource interactions. A service resource can be selected for the customer service request based upon the resource preference rating. Communications can thereafter be established via a selected communication channel between the customer and the selected service resource.

In one embodiment, multiple routing criteria each having an associated criteria value can be retrieved for each service resource. Moreover, routing weights can be identified for each routing criteria. A sum of the product of the various routing weights and the criteria values can be used to derive the resource preference rating. In another embodiment, feedback can be received concerning past service requests. Values for routing criteria can be automatically altered based at least in part upon the feedback.

Another aspect of the present invention concerns a system for managing CRM resources. The system can include a service router, a routing data store, and a feedback processor. The service router can be communicatively linked via multiple communication channels to multiple response mechanisms. Moreover, the service router can be configured to automatically route service requests received from multiple request mechanisms to selected ones of the response mechanisms. The routing data store can include routing criteria, wherein the routing of the service requests by the service router can be based at least in part upon the routing criteria. Further, the feedback processor can be configured to dynamically modify values for the routing criteria based upon received feedback. At least a portion of the feedback can be based upon past performance in handling past service requests.

Additionally, a feedback warehouse can be configured to store feedback data received from multiple sources. The feedback processor can be further configured to data mine the feedback data in order to alter the routing criteria. Values for routing criteria can be manually altered by administrators through a routing management interface. In one embodiment, the routing management interface can include business analysis tools configured to analyze, query, summarize, and generate reports for managers and/or administrators of the system.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method, a system, and an apparatus for managing customer service resources. More particularly, service requests received from customers via a multitude of different communication channels can be directed toward a service router. The service router can determine the best resource for responding to the service request using predetermined values for routing criteria associated with each service resource. At least a portion of the routing criteria can refer to prior customer service request interactions. The service router can then communicatively link the customer with the selected service resource. Notably, values for the routing criteria used by the service router can be dynamically modified based upon received feedback.

Figure 1:
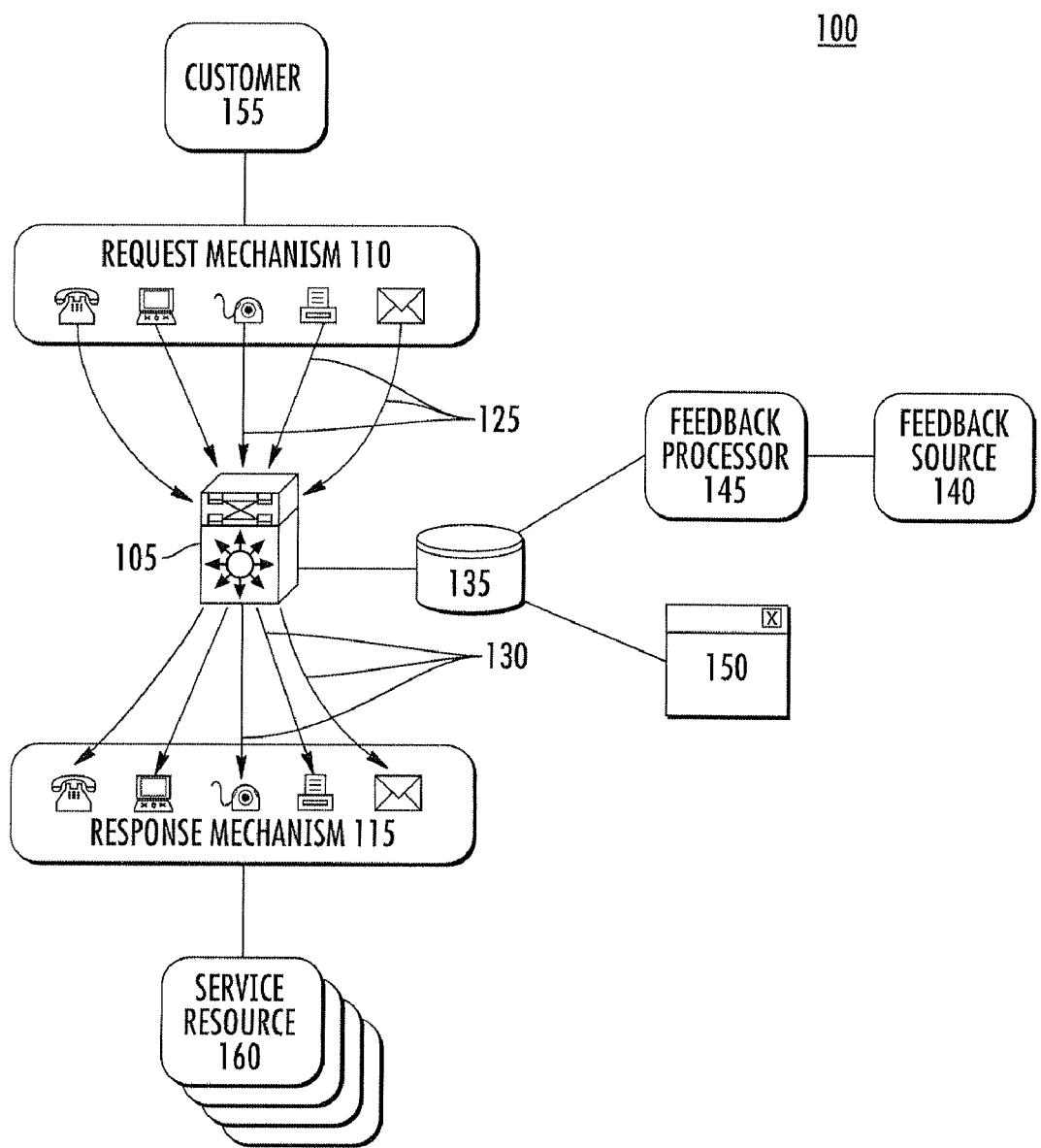
FIG. 1 is a schematic diagram of a system including an exemplary service router configured to intelligently route service requests to service resources in accordance with the inventive arrangements disclosed herein.

FIG. 1 is a schematic diagram of a system 100 for a service router configured to intelligently route service requests to service resources. The system 100 can include a service router 105, a request mechanism 110, a response mechanism 115, and a multitude of communication channels, such as request channel 125 and/or service channel 130. The system 100 can also include a routing data store 135, a feedback processor 145, and a routing management interface 150.

The service router 105 can be a computing device for centrally managing the resources of a customer relationship management (CRM) system in real-time. The service router 105 can receive and automatically route service requests to an appropriate CRM resource based upon predetermined routing criteria. In one embodiment, the service router 105 can include both hardware and software components. Further, the service router 105 can be a stand-alone computing device or can be a series of communicatively linked distributed computing devices that together route service requests. The service router 105 can also be either a general purpose computing device, such as a computer containing message routing software and peripheral devices, or it can be a dedicated computing device, such as a router or hub with embedded software and/or firmware.

The request mechanism 110 can be any of a variety of communication mechanisms capable of conveying a service request to the service router 105. The request mechanisms 110 can include a variety of physical communication tools, such as computers and peripherals, personal data assistants (PDA's), telephones, fax machines, Web cameras, pen and paper, and the like. Further, request mechanisms 110 can be interactive requiring the establishment of a real-time, two-way communication link. Interactive mechanisms can include, but are not limited to, telephony mechanisms, video teleconferencing mechanisms, Internet chat mechanisms, and instant messaging mechanisms. Alternatively, request mechanisms 110 can be message based mechanisms not requiring the establishment of a real-time, two-way communication link. Message-based mechanisms can include, for example, email mechanisms, fax mechanisms, and/or postal mail mechanisms.

Similarly, the response mechanisms 115 can be any of a variety of communication mechanisms capable of responding to service request. Like request mechanisms 110, response mechanisms 115 can be interactive or message-based. The response mechanism 115 need not be identical to the request mechanism 110. For example, a service request sent via an email request mechanism 110 can result in reply being sent via a fax response mechanism 115.

The request mechanisms 110 and the response mechanisms 115 can be communicatively linked to the service router 105 via communication channels. The communication channels can include, but are not limited to, a telephony channel, a teleconference channel, a co-browsing channel, an Internet chat channel, an instant messenger channel, an email channel, a postal mail channel, and/or a fax channel. Notably, a co-browsing channel can be a communication channel involving two or more interactively linked Web browsing applications, wherein operations performed on either of the linked browsers affects the other linked browser. Communication channels linking request mechanisms 110 to the service router 105 can be referred to as request channels 125, while communication channels linking response mechanisms 115 to the service router 105 can be referred to as response channels 130.

The routing data store 135 can be a memory communicatively linked to the service router 105 configured to store, query, update, and delete data used by the service router 105. The routing data store 135 can represent any type of memory storage space, such as a space within a magnetic and/or optical fixed storage device, a space within a temporary memory location like random access memory (RAM), and a virtual storage space distributed across a network. Further, the data within the routing data store 135 can be stored in any fashion, such as within a database, within an indexed file or files, within non-indexed file or files, within a data heap, and the like.

The routing data store 135 can include values for routing criteria upon which the automatic routing performed by the service router 105 can be based. Routing criteria can include, but are not limited to, resource availability, resource skills, resource language, resource location, resource cost, resource service efficiency, resource sales efficiency, resource customer satisfaction, and/or resource management satisfaction.

The service resource 160 can represent a potential resource for responding to a service request. For example, a service resource 160 can be an agent of the CRM system. Agents can include customer service representatives (CSRs), customer service managers, point of sale agents located in retail outlets, technical assistants, and the like. Alternatively, a service resource 160 can be an automated resource, such as an interactive voice response (IVR) system and an informational Web site. Further, the service resource 160 can be an in-house resource owned and operated by the CRM owner or can be an external resource, such as outsourced technical assistance resource.

The feedback processor 145 can be a combination of hardware and/or software components for processing feedback from a feedback source 140 in order to dynamically alter values for routing criteria. The feedback processor 145 can include document scanning equipment, sales analysis tools, survey evaluation mechanisms, and the like. At least a portion of the feedback processed by the feedback processor 145 can reflect past performance in handling past service requests. For example, feedback can include, but is not limited to satisfaction surveys, customer correspondence, sales information, service handling data, personnel appraisals, and sales information resulting from a service request.

The routing management interface 150 can be used to administratively alter the routing information contained within the routing data store 135. For example, a manager and/or administrator of system 100 can adjust parameters to increase the significance of one routing criteria compared to another, such as increasing the weight of resource cost relative to resource customer satisfaction or vice-versa. Additionally, the routing management interface 150 can include business analysis tools for analyzing the manner in which the system 100 has handled service requests. For example, business analysis tools can be configured to analyze, query, summarize, and generate reports comparing various service resources 160 to each other.

In operation, a customer 155 can utilize a request mechanism 110 to submit a service request. The request mechanism 110 can convey the service request to the service router 105 via a request channel 125. The service router 105 can select a resource from among a multitude of available service resources 160 to handle the service request. That is, the service router 105 can analyze the incoming service request for request characteristics and compare the request characteristics to routing criteria. Request characteristics can include a variety of characteristics for aiding the selection of a suitable request response, such as customer location, customer language, request channel used, request subject matter, preferred respondent, and the like. The selection of a service resource 160 can be based in part upon a resource preference rating determined from routing criteria. More specifically, a resource preference rating can be generated for each available service resource 160 and the service resource 160 with the most favorable resource preference rating can be selected to handle the service request. Once a service resource 160 is selected, the service request can be conveyed to one or more response mechanisms 115 associated with the service resource 160.

In one embodiment, the service resources 160 can consist of a variety of different customer service representatives (CSRs), each having different skills and abilities. The skills and/or abilities of each CSR in regards to designated communication channels are quantified within the routing data store 135 as routing criteria. The values of the routing criteria for the CSRs can determine the routing of service requests. Moreover, the values of the routing criteria can be a measurement of the effectiveness of an agent for each available communication channel. The higher the routing criteria value for a CSR for a selected communication channel, the more effective that CSR is at providing services and/or selling products via the selected communication channel.

As each CSR gains experience with different communication channels, the CSR's effectiveness over the different communication channels can change. The purpose of the feedback processor 145, in this embodiment, is to receive feedback denoting CSR effectiveness with each communication channel and to responsively alter the routing criteria values for the CSR so that the CSR's current effectiveness is dynamically reflected.

For example, one routing criterion, referred to as service efficiency, can denote the time required by a CSR to complete a sale and/or address a customer issue over a telephone. Every time the CSR responds to a new service request via the telephone, the system 100 can automatically track and store the time the CSR spends responding to the service request. Periodically, such as on a nightly or weekly basis, the stored response times can be used to automatically update the service efficiency of the CSR for the telephone channel.

In another example, a different routing criterion, referred to as sales efficiency, can denote the ratio of service request to sales for a CSR via the telephony channel. Every time the CSR receives a service request such as a sales inquiry, the system 100 can automatically increase a stored value representing the number of service requests that the CSR has received. If the sales inquiry results in a sale, the system 100 can automatically increase the stored value representing the number of sales for that CSR. Periodically, a new ratio of service request to sales can be automatically calculated for the CSR and the sales efficiency routing criterion can be responsively adjusted.

Figure 2:
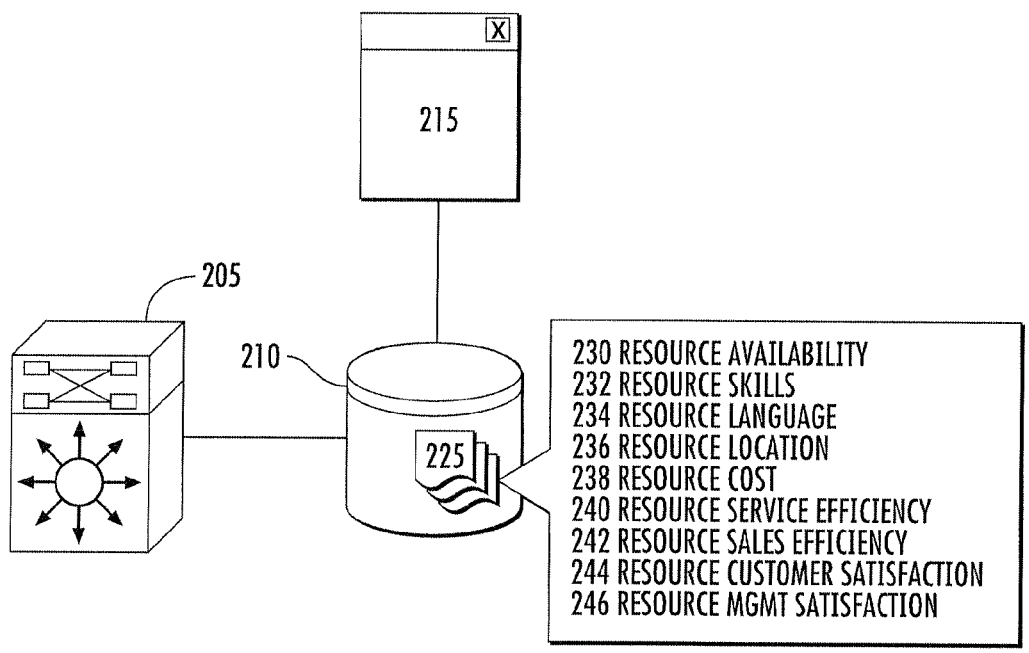
FIG. 2 is a schematic diagram of a system including an exemplary service router in accordance with the system detailed in FIG. 1.

FIG. 2 is a schematic diagram of a system 200 including an exemplary service router in accordance with the system detailed in FIG. 1. The system 200 includes a service router 205, a routing data store 210, and a router management interface 215. The service router 205 as previously mentioned automatically routes incoming service request to service resources. This routing is based in part upon values for routing criteria 225 stored within the routing data store 210.

The routing criteria 225 are communication channel specific parameters used by the service router 205 to determine the most appropriate resource to which a service request should be routed. There can be many different types of routing criteria 225 differentially treated within the system 200. One type of routing criteria is threshold criteria that must be satisfied or else a service resource will not be considered a viable asset for responding to a service request. Another type of routing criteria is a weighted criteria, which represents a preference for a particular service resource, as opposed to being a threshold for viability.

Exemplary threshold criteria can include a resource availability 230, a resource skill 232, and/or a resource language 234 criteria. That is, if a service request requires an interactive response and the resource availability 230 criteria indicates a service resource is not presently available, then that service resource cannot be selected. Similarly, if at least a minimum competency level in a resource skill 232, such as the Internet chatting skill, is required, then service resources having a skill below that minimum level cannot be selected by the service router 205. Likewise, if a resource language 234, such as speaking Spanish, is lacking then the associated service resource cannot be selected.

Exemplary weighed criteria can include a resource location 236, a resource cost 238, a resource service efficiency 240, a resource sales efficiency 242, a resource customer satisfaction 244, and/or a resource management satisfaction 246.

The resource location 236 can be based upon the physical location of a service resource. For example, a service resource located in the same state as the customer making a service request can be preferred over a service resource located in a different state. In another example, the resource location 236 can refer to the whether a CSR is located within a work environment or at home, with the workplace being preferred. In such an example, the resource location 236 for CSRs can be automatically adjusted based upon a system feedback, such as feedback provided by an automated time entry system and/or a distributed computer system that monitors user login location.

The resource cost 238 can refer to the pecuniary cost associated with a particular service resource responding to a service request. Resource cost 238, like other routing criteria, can be automatically adjusted. For example, telephone toll charges can be greater during the work day than during evening hours causing the resource cost 238 paid by a business to be greater during the work day than at night. Accordingly, the resource cost 238 for a resource including a telephone mechanism subject to toll charges can be automatically adjusted depending on the time of day due to the variable toll charges. In another example, different resources costs 238 can be associated with resource usage thresholds. For example, a particular resource, such as a CSR, can have an increased cost for work exceeding a predetermined weekly amount (i.e. CSRs working over 40 hours a week can receive overtime wages). Therefore, the system can automatically track the number of weekly hours each CSR has worked, and upwardly adjust the resource cost 238 for a particular CSR whenever the usage threshold (i.e. 40 hours per week) for that CSR is exceeded.

The resource service efficiency 240 can refer to the average time required for a resource to complete a service response. The resource sales efficiency 242 can refer to customer sales resulting from or subsequent to service responses provided by a resource. The resource customer satisfaction 244 can indicate a satisfaction level of customers with responses provided by a resource. The resource management satisfaction 246 can indicate a satisfaction level of managers with responses provided by a resource.

The routing management interface 215 can provide an interface to view, add, alter, and delete routing data. Further, the routing management interface 215 can allow an authorized user to adjust routing threshold values, criteria values, and/or criteria weights. In one embodiment, a series of business preferences can be established to alter default criteria weights. For example, a business preference for short-term-profits can result in resource cost 238 having a greater relative criteria weight than resource customer satisfaction 244. Alternatively, a business preference for long-term-profits can result in resource cost 238 having a lesser relative criteria weight than resource customer satisfaction 244.

Figure 3:
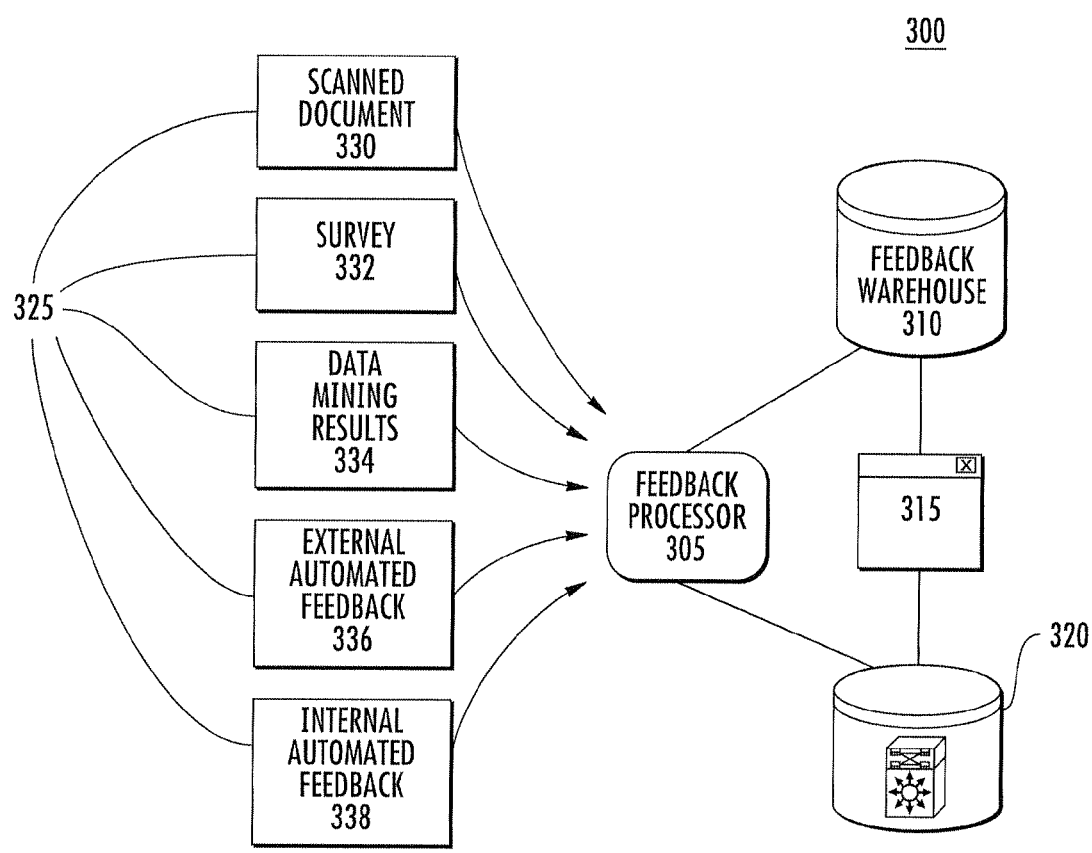
FIG. 3 is a schematic diagram of an exemplary feedback system in accordance with the system of FIG. 1.

FIG. 3 is a schematic diagram of an exemplary feedback system 300 in accordance with the system of FIG. 1. The system 300 can include a feedback processor 305, a feedback warehouse 310, a routing management interface 315, and a routing data store 320.

In one embodiment, various types of feedback 325 can be received by the feedback processor 305. The feedback processor 305 can identify a feedback rating associated with the feedback 325. Notably, each feedback rating can be determined automatically through algorithms, heuristics, and/or feedback criteria or manually through the intervention of an agent. For example, a scanned document representing feedback 325 can be automatically searched for words indicative of customer satisfaction, such as "enjoyed", "satisfied", "thank you", and the like, and a feedback rating can be responsively determined based on such words within the scanned document. Alternately, a human agent could read the exemplary scanned document and assign a feedback rating to it.

Exemplary feedback 325 can be gathered from a number of different sources and can be extracted from multiple different feedback instrumentalities including, but not limited to, scanned documents 330, surveys 332, data mining results 334, external automated feedback 336, and internal automated feedback 338.

Data mining results refers to the process of sorting through data to identify patterns and relationships contained within the data. The feedback warehouse 310 can store the data that is data mined, such as customer sales data and service request records. Data mining results 334 can indicate sale levels resulting from service requests handled by a particular service resource. Accordingly, a feedback rating can be automatically assigned to a service resource based upon data mining results 334.

Automated feedback can refer to service request processing data automatically recorded whenever responses to service requests occur. Service request processing data can include a time, date, and duration of a service request. Service request processing data can also include data concerning customer satisfaction, such as customer complaints information, a management intervention indicator, and customer survey results. Different types of automated feedback can result from the utilization of different response mechanisms. For example, an email response mechanism can record different service request processing data than a fax response mechanism.

Further, automated feedback can be either external automated feedback 336 or internal automated feedback 338. External automated feedback 336 refers to feedback provided by external service resources, such as an externally provided technical support. Internal automated feedback 338 refers to feedback recorded for internal service resources. Notably, external automated feedback 336 can vary in scope and form from internal automated feedback 338, yet both can still be processed by the feedback processor 305.

Figure 4:
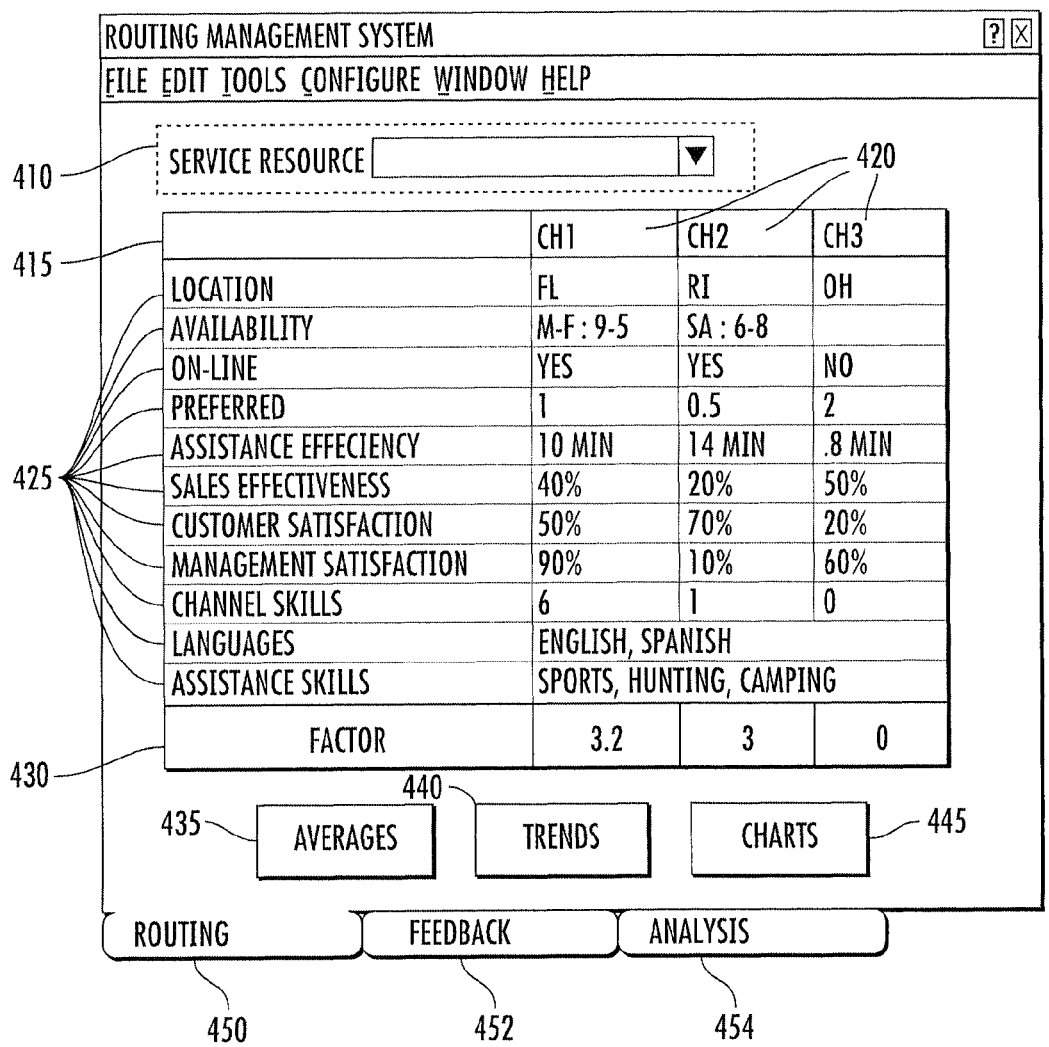
FIG. 4 is a graphical user interface of an exemplary routing management interface for use with the inventive arrangements disclosed herein.

FIG. 4 is a graphical user interface (GUI) 400 of an exemplary routing management interface in accordance with FIGS. 1, 2, and 3. Through GUI 400 authorized administrators and managers can monitor, query, add, change, delete, and modify parameters, algorithms, and events relating to the routing of service requests to service resources. The GUI 400 can include a routing view 450, a feedback view 452, and an analysis view 454.

The routing view 450 can present data contained within the routing data store in a meaningful fashion so that the data can be managed by administrative personnel. In one embodiment, the routing view 450 can include a resource selection item 410, a routing criteria table 415, and various reporting options. The resource item 410 can allow an administrator to query, add, delete, and/or update a service resource. For example, the resource item 410 can be implemented as a drop-down list box from which existing service resources can be selected. In such an example, once a resource is selected, information within the routing criteria 415 can be automatically updated to reflect data for the selected resource.

The routing criteria table 415 can contain routing criteria data pertaining to a resource. Within the routing criteria table 415, data can be organized by routing criteria 425 and by communication channel 420. In one embodiment, the data presented within the routing criteria 415 can be converted in a user-friendly fashion. For example, the criteria value stored as a numeric rating for the sales effectiveness routing criteria 425 can be converted into a percentage value when displayed within the routing criteria table 415. Various reporting options can be provided for each view in the GUI 400. For example, the routing view 450 can include options for averages 435, trends 440, and charts 445. The reporting options can provide managers and administrators with useful reports that summarize view data. One such report, for example, can list each service resource by channel and preference rating allowing managers to quickly appraise the performance of different service resources relative to one another.

The feedback view 452 can permit feedback parameters, rules, and data to be administratively viewed and altered. The feedback view 452 can contain similar interface features as the routing view 450, such as a selection box, a table view, and reporting options. The analysis view 454 can be a catch all for performing desired analysis functions not contained within the routing view 450 or feedback view 452. For example, the analysis view 454 can permit users to construct, save, and trigger user-specific reports. In such an example, the user-generated reports can be structured query language (SQL) based reports generated via a user-friendly front-end interface.

Figure 5:
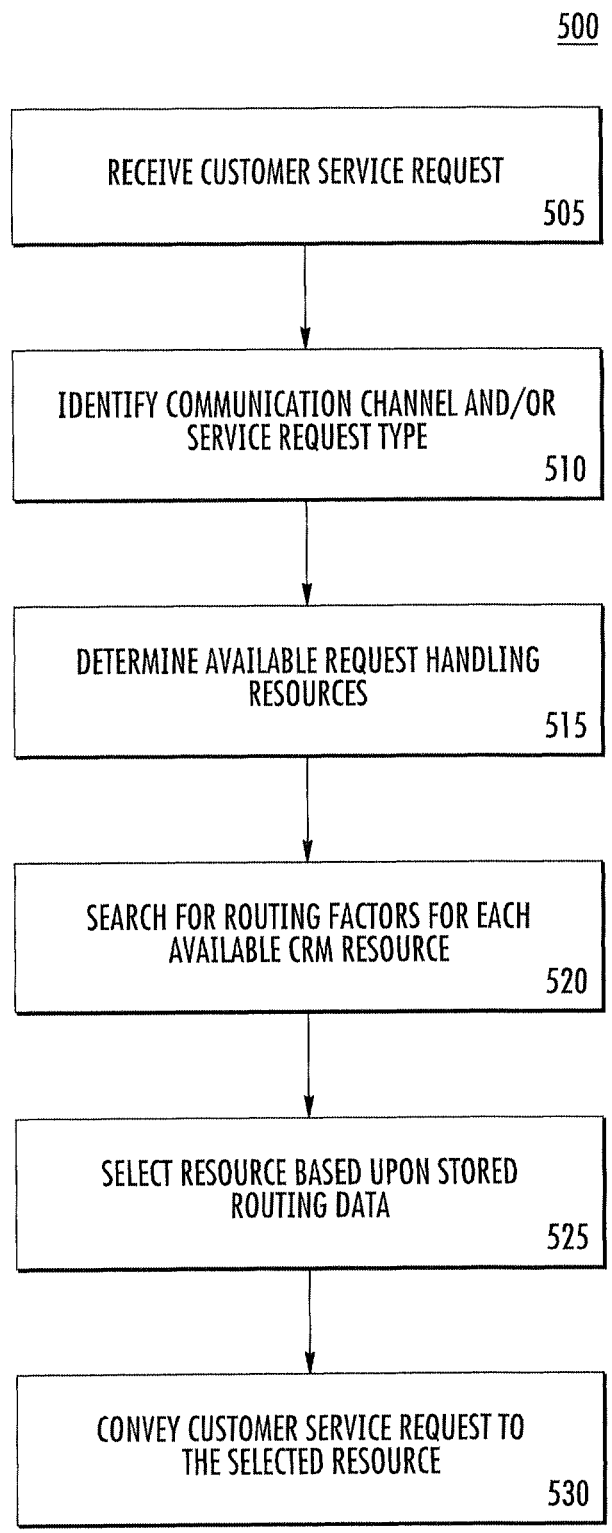
FIG. 5 is a flowchart illustrating a method for routing a service request in accordance with the inventive arrangements disclosed herein.

FIG. 5 is a flowchart illustrating a method 500 for an exemplary service request routing instance in accordance with the system of FIG. 1. Method 500 can be performed in the context of a CRM system that includes a service router through which received service requests are routed to service resources. The method can begin in step 505 with the receipt of a customer service request. Customer service requests can include any of a variety of CRM based requests such as billing requests, support requests, sales requests, product inquiries, incentive program requests, and the like.

In step 510, the communication channel through which the service request was received can be identified. Notably, multiple communication channels including interactive channels and message-based channels can exist. The communication channel used to respond to a service request will typically be the same as the communication channel through which the request was submitted. That is, if a service request arrives via email, an email response will be provided. Occasionally, however, a different communication channel can be used to convey a response. For example, a received email service request can have a postal mail message and/or a fax message response. Additionally, the service request type, which refers to the contextual subject matter of the service request, can be identified in step 510. Service request types can include technical support requests, product inquiries, billing inquiries, and the like.

In step 515, a list of available service resources capable of handling the service request can be determined. Threshold routing criteria, such as resource availability criteria, can be used to determine which service resources can respond to the service request. Once a list of available resources has been constructed, the method can proceed to step 520 where a multitude of predetermined criteria values and criteria weights can be retrieved from a routing data store for each service resource within the list of available services resources.

In step 525, a service resource can be selected based upon the data retrieved in step 520. For example, a resource preference rating can be calculated for each service resource and the resource with the most favorable rating can be selected. The resource preference rating can be the sum of the values for each routing criteria, wherein each routing criteria value can be the product of the criteria value times the criteria weight. In step 530, the customer service request can be conveyed to the selected resource. If this conveyance involves an interactive channel, a two-way communication link can be established between the customer making the service request and the selected resource. If the conveyance involves a message-based channel, the message including the service request can be placed within a location that the selected resource can access, and a notification of the new service request can be sent to the selected resource.

The various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A system for managing customer relationship management resources comprising:
   a service router communicatively linked through a plurality of communication channels to a plurality of response mechanisms associated with a plurality of service resources, wherein said service router is configured to receive service requests, analyze the service requests for request characteristics, compare the request characteristics to routing data, and route the service requests to selected ones of said response mechanisms based at least in part upon the comparing;
   a routing data store comprising the routing data utilized by said service router to route said service requests, wherein said routing data comprises criteria values for routing criteria;
   a feedback processor configured to dynamically modify said routing data based upon received feedback, update at least one of a skills base and a profile of the plurality of service resources based on the feedback, and dynamically determine an appropriate routing based upon the updated skills base and/or profile of the service resources and the routing data, wherein at least a portion of said feedback is based upon past performance in handling past service requests; and
   a feedback warehouse configured to store feedback data automatically captured about previous interactions received from a plurality of sources including at least one of scanned documents, surveys, data mining results, external automated feedback and internal automated feedback mechanisms.

2. The system of claim 1, further comprising:
   a routing management interface configured to administratively alter said routing data.

3. The system of claim 2, wherein said routing management interface further comprises:
   business analysis tools configured to permit at least one of managers and administrators to analyze, query, summarize, and generate reports using data from said system.

4. A system for managing custom relationship management (CRM) resources comprising the steps of:
   means for communicatively linking a service router to a plurality of service resources;
   for each of said service resources, means for establishing at least one routing criterion;
   means for receiving a plurality of service requests via a plurality of communication channels;
   means for analyzing said service requests for request characteristics;
   means for comparing said request characteristics to routing criteria;
   means for automatically routing each of said service requests to a selected service resource based at least in part upon said comparing step;
   means configured to store feedback data automatically captured about previous interactions received from a plurality of sources including at least one of scanned documents, surveys, data mining results, external automated feedback and internal automated feedback mechanisms;
   means for updating at least one of a skills base and a profile of the service resources based on the feedback data; and
   means for dynamically determining an appropriate routing based upon the updated skills base and/or profile of the service resources and the existing routing criteria.

5. A system for routing customer service requests within a customer relationship management (CRM) system comprising the steps of:
   means for receiving a service request from a customer via a communication channel;
   means for searching a routing data store for available service resources, wherein at least a portion of said service resources represent customer service representatives;
   for each available service resource, means for computing a resource preference rating based at least in part upon previous service resource interactions via said communication channel;
   means for selecting a service resource for said customer service request based upon said resource preference rating;
   means for establishing communications via said communication channel between said customer and said selected service resource;
   means for automatically updating at least one of a skills base or a profile of the service resources based upon information from a feedback warehouse containing information automatically captured about previous interactions from a plurality of sources including at least one of scanned documents, surveys, data mining results, external automated feedback and internal automated feedback mechanisms; and
   means for dynamically determining an appropriate routing based upon the updated skills base and/or profile of the service resources and the existing resource preference rating.

6. A non-transitory storage medium having stored thereon, a computer program having a plurality of code sections, said code sections executable by a machine for causing the machine to perform the steps of:
   communicatively linking a service router to a plurality of service resources;
   for each of said service resources, establishing at least one routing criterion;
   receiving a plurality of service requests via a plurality of communication channels;
   analyzing said service requests for request characteristics;
   comparing said request characteristics to routing criteria;
   automatically routing each of said service requests to a selected service resource based at least in part upon said comparing step;
   obtaining a feedback from a feedback warehouse containing information automatically captured about previous interactions from a plurality of sources including at least one of scanned documents, surveys, data mining results, external automated feedback, and internal automated feedback mechanisms;

updating at least one of a skills base and a profile of the service resources based on the feedback; and dynamically determining an appropriate routing based upon the updated skills base and/or profile of the service resources and the existing routing criteria.

7. The non-transitory storage medium of claim 6, wherein said communication channel of said receiving step is selected from the group consisting of a telephony channel, a teleconference channel, a co-browsing channel, an Internet chat channel, an instant messenger channel, an email channel, a postal mail channel, and a fax channel.

8. The non-transitory storage medium of claim 6, wherein said routing criteria of said establishing step is selected from the group consisting of resource availability, resource skills, resource language, resource location, resource cost, resource service efficiency, resource sales efficiency, resource customer satisfaction, and resource management satisfaction.

9. The non-transitory storage medium of claim 6, further comprising the step of:

for each of said service resources, identifying at least one communication channel over which said service resource can respond to said service requests, wherein values for said at least one routing criterion depend upon said identified communication channel.

10. The non-transitory storage medium of claim 6, further comprising the step of:

receiving said feedback from a plurality of sources at least a portion of which reflect past performance in handling past service requests.

11. The non-transitory storage medium of claim 10, further comprising the steps of:

automatically extracting said feedback from a feedback instrumentality; and, assigning a feedback rating to said feedback.

12. The non-transitory storage medium of claim 6, further comprising the steps of:

data mining customer sales information to rate the success of a particular service request response; and, responsive to said data mining step, altering at least a portion of said routing criteria for said service resource associated with said service request response.

13. The non-transitory storage medium of claim 6, further comprising the steps of:

monitoring at least a portion of said service requests to obtain performance information;

determining efficiency metrics from said monitoring; and, dynamically altering values for said routing criteria based upon said efficiency metrics.

14. The non-transitory storage medium of claim 6, further comprising the step of:

administratively modifying values for said routing criteria via a routing management interface.

15. A non-transitory storage medium having stored thereon, a computer program having a plurality of code sections, said code sections executable by a machine for causing the machine to perform the steps of:

receiving a service request from a customer via a communication channel;

searching a routing data store for available service resources, wherein at least a portion of said service resources represent customer service representatives;

for each available service resource, computing a resource preference rating based at least in part upon previous service resource interactions via said communication channel;

selecting a service resource for said customer service request based upon said resource preference rating;

establishing communications via said communication channel between said customer and said selected service resource;

automatically updating at least one of a skills base or a profile of the service resources based upon information from a feedback warehouse containing information automatically captured about previous interactions from a plurality of sources including at least one of scanned documents, surveys, data mining results, external automated feedback and internal automated feedback mechanisms; and dynamically determining an appropriate routing based upon the updated skills base and/or profile of the service resources and the existing resource preference rating.

16. The non-transitory storage medium of claim 15, wherein said computing step further comprises the steps of:

for each service resource, receiving a plurality of criteria values for routing criteria;

identifying routing weights for each of said routing criteria;

for each of said routing criteria, multiplying said routing weight and said criteria value; and, summing results from said multiplying to compute said resource preference rating.

17. The non-transitory storage medium of claim 15, further comprising the steps of:

receiving feedback about said service request; and, automatically altering at least one of said criteria values of an associated service resource in response to said feedback.

* * * * *